US012126679B1

(12) United States Patent
Demsey (10) Patent No.: US 12,126,679 B1
(45) Date of Patent: *Oct. 22, 2024

(54) SYSTEMS AND METHODS FOR SYNDICATED DISTRIBUTION OF ELECTRONIC CONTENT

(71) Applicant: Yahoo Ad Tech LLC, Dulles, VA (US)

(72) Inventor: Seth Mitchell Demsey, Dulles, VA (US)

(73) Assignee: Yahoo Ad Tech LLC, New York, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/049,104

(22) Filed: Oct. 24, 2022

Related U.S. Application Data

(63) Continuation of application No. 17/451,957, filed on Oct. 22, 2021, now Pat. No. 11,509,714, which is a
(Continued)

(51) Int. Cl.
| | |
|---|---|
| *H04L 67/1087* | (2022.01) |
| *H04L 67/02* | (2022.01) |
| *H04L 67/289* | (2022.01) |
| *H04L 67/563* | (2022.01) |
| *H04L 67/565* | (2022.01) |
| *H04L 67/5681* | (2022.01) |
| *H04L 67/5682* | (2022.01) |
| *H04L 67/5683* | (2022.01) |

(Continued)

(52) U.S. Cl.
CPC .......... *H04L 67/1091* (2013.01); *H04L 67/02* (2013.01); *H04L 67/289* (2013.01); *H04L 67/563* (2022.05); *H04L 67/565* (2022.05); *H04L 67/5681* (2022.05); *H04L 67/5682* (2022.05); *H04L 67/5683* (2022.05); *H04L 69/04* (2013.01); *H04M 1/72445* (2021.01)

(58) Field of Classification Search
None
See application file for complete search history.

(56) References Cited

U.S. PATENT DOCUMENTS

| | | |
|---|---|---|
| 10,104,172 B1 | 10/2018 | Demsey |
| 11,190,585 B2 | 11/2021 | Demsey |

(Continued)

*Primary Examiner* — Tonia L Dollinger
*Assistant Examiner* — Ishrat Rashid
(74) *Attorney, Agent, or Firm* — Bookoff McAndrews PLLC (57) ABSTRACT

Systems and methods are disclosed for online distribution of content by receiving, from a user's mobile device, a request for a web page hosted by a publisher's CMS; applying a rules engine to analyze a received URL according to a set of rules identifying one or more website types and/or referrers; if the received URL satisfies the rules engine, redirecting the received request to a syndication server system hosted within a global CDN; adding a URL of the web page to a missing content queue and redirecting the request to the publisher's CMS if the CDN syndication server does not contain a suitable mobile-formatted version of the web page; and delivering a package of binary compressed content of the web page to a stub page cached at the user's mobile device by the CDN syndication server, using recirculation and monetization components chosen by the publisher.

20 Claims, 4 Drawing Sheets

Related U.S. Application Data continuation of application No. 16/119,043, filed on Aug. 31, 2018, now Pat. No. 11,190,585, which is a continuation of application No. 14/884,604, filed on Oct. 15, 2015, now Pat. No. 10,104,172.

(51) Int. Cl.
  *H04L 69/04* (2022.01)
  *H04M 1/72445* (2021.01)

(56) References Cited

U.S. PATENT DOCUMENTS

| | | | |
|---|---|---|---|
| 2001/0056460 A1 | 12/2001 | Sahota et al. | |
| 2002/0143819 A1* | 10/2002 | Han | G06F 16/958 |
| | | | 715/237 |
| 2008/0066172 A1* | 3/2008 | Tarsi | H04L 63/105 |
| | | | 726/9 |
| 2010/0263020 A1* | 10/2010 | Harrison | G06F 16/40 |
| | | | 726/1 |
| 2011/0029641 A1 | 2/2011 | Fainberg et al. | |
| 2011/0197032 A1* | 8/2011 | Patey | G06F 16/24552 |
| | | | 709/224 |
| 2011/0320524 A1 | 12/2011 | Nandagopal | |
| 2013/0080268 A1* | 3/2013 | Gordon | G06F 16/41 |
| | | | 709/217 |
| 2013/0268673 A1 | 10/2013 | Graham-Cumming | |
| 2014/0006931 A1* | 1/2014 | Pettitt | G06F 40/143 |
| | | | 715/234 |
| 2015/0066615 A1* | 3/2015 | Gandhi | G06Q 50/01 |
| | | | 705/14.16 |
| 2016/0191598 A1* | 6/2016 | DeFrancesco | G06Q 30/0277 |
| | | | 709/219 |
| 2017/0192987 A1 | 7/2017 | Desineni et al. | |

* cited by examiner

```
┌─────────────────────────────────────────────────────────────────────┐
│ RECEIVING, FROM A USER'S MOBILE DEVICE, A REQUEST FOR A WEB PAGE    │ 302
│ HOSTED BY A PUBLISHER'S CONTENT MANAGEMENT SYSTEM ("CMS"), THE      │
│ REQUEST INCLUDING THE URL OF THE REQUESTED WEB SITE                 │
└─────────────────────────────────────────────────────────────────────┘
                                  ↓
┌─────────────────────────────────────────────────────────────────────┐
│ APPLYING A RULES ENGINE TO ANALYZE THE RECEIVED URL ACCORDING TO A  │ 304
│ SET OF RULES, THE SET OF RULES IDENTIFYING ONE OR MORE WEBSITE      │
│ TYPES (E.G., URLS, DOMAINS, ETC.) AND/OR ONE OR MORE REFERRERS      │
│ (E.G., A SOCIAL NETWORK)                                            │
└─────────────────────────────────────────────────────────────────────┘
                                  ↓
┌─────────────────────────────────────────────────────────────────────┐
│ IF THE RECEIVED URL SATISFIES THE RULES ENGINE, REDIRECTING THE     │ 306
│ RECEIVED REQUEST TO A SYNDICATION SERVER SYSTEM HOSTED WITHIN A     │
│ GLOBAL CONTENT DISTRIBUTION NETWORK ("CDN"), THE CDN MAINTAINING    │
│ FAST-LOADING, TEMPLATIZED WEB-, MOBILE-, AND/OR APP-FORMATTED       │
│ VERSIONS OF THE WEB PAGE                                            │
└─────────────────────────────────────────────────────────────────────┘
                                  ↓
┌─────────────────────────────────────────────────────────────────────┐
│ OPTIONALLY ADDING A URL OF THE WEB PAGE TO A MISSING CONTENT QUEUE  │ 308
│ AND REDIRECTING THE REQUEST TO A WEB SERVER OF THE PUBLISHER'S CMS  │
│ OF THE CDN SYNDICATION SERVER DOES NOT CONTAIN A SUITABLE WEB-,     │
│ MOBILE-, AND/OR APP-FORMATTED (AS APPLICABLE) VERSION OF THE WEB    │
│ PAGE                                                                │
└─────────────────────────────────────────────────────────────────────┘
                                  ↓
┌─────────────────────────────────────────────────────────────────────┐
│ DELIVERING A PACKAGE OF BINARY COMPRESSED CONTENT OF THE WEB PAGE   │ 310
│ TO A STUB PAGE CACHED AT THE USER'S MOBILE DEVICE BY THE CDN        │
│ SYNDICATION SERVER, OPTIONALLY USING RECIRCULATION AND MONETIZATION │
│ COMPONENTS CHOSEN BY THE PUBLISHER                                  │
└─────────────────────────────────────────────────────────────────────┘
```

SYSTEMS AND METHODS FOR SYNDICATED DISTRIBUTION OF ELECTRONIC CONTENT

CROSS-REFERENCE TO RELATED APPLICATION(S)

This patent application is a continuation of and claims the benefit of priority to U.S. application Ser. No. 17/451,957, filed on Oct. 22, 2021, which is a continuation of and claims the benefit of priority to U.S. application Ser. No. 16/119,043, filed on Aug. 31, 2018, now U.S. Pat. No. 11,190,585, which is a continuation of and claims the benefit of priority U.S. application Ser. No. 14/884,604, filed Oct. 15, 2015, now U.S. Pat. No. 10,104,172, the entireties of which are incorporated herein by reference.

TECHNICAL FIELD

Various embodiments of the present disclosure relate generally to managing the distribution of online content. More specifically, exemplary embodiments of the present disclosure relate to systems and methods for syndicated distribution of electronic content over the Internet.

BACKGROUND

Recently, it has been widely reported that mobile devices are the new leader in content. Whereas people used to consume the majority of their content through television and desktop websites, people are more often turning to their mobile devices (e.g., cell phones, tablets, PDAs, smartphones, wearables, etc.) to view electronic content. People are also increasingly viewing mobile content through non-browser mobile apps, such as social networking mobile applications.

Currently, in the context of mobile applications, when a user selects a website link within a mobile application, the app opens a "webview" within the current view portal, retrieves content of the requested web page from a remote web server, and loads and assembles the web page for the user to view. The app also usually enables the user to click a back button, e.g., an "x," or some other user element to close the webview to return to the mobile application in which the webview had been opened. Notably, the web page is loaded within an in-app browser of the application, such as a social networking application, using content that is hosted exogenous to the application. For example, if a user is browsing a feed of a social networking application and clicks on an article, such as a Huffington Post article, the social networking application will open a light browser within the app, request ("call") the article from a Huffington Post web server, and load the page within the browser within the social networking application.

One downside to in-app webviews is that they are traditionally very slow (sometimes taking as long as 10 seconds to load a full web page), they have high rates of crashes and users aborting, and they also typically do not pass through cookies, user data, or other sign-in data. In view of the downsides of in-app webviews, some social networks are now experimenting with implementing content hosting systems to actually host web content to be clicked on from within the social network's application. The social networks are touting that doing so may improve the speed of loading content within their applications, and that they can do so while maintaining publishers' and advertisers' ability to buy and sell ads within the content, despite the content being hosted by the social network. The social networks are encouraging publishers to host their content on the social networks' content hosting systems by using both positive and negative incentives. For example, social networks that are uniquely large may be leveraging their ability to alter their algorithms for determining what content appears within the social network's news feed based on whether the publisher has opted-in to the social network's content hosting system. In other words, some social networks may have the ability to "traffic shape" away from web, and toward their own content hosting ecosystem. This may cause a precipitous drop in social-network-referred page views for non-partners (i.e., publishers that are not opted-in to the ecosystem).

To publishers, this regime of social-network-hosted content means that some mobile traffic will be sold through actual mobile, vs. through a regime established by the social networks. This may involve publishers maintaining two different sales systems: one for traditional mobile traffic, and one for managing content delivered through the social network's ecosystem. Joining the social network's content hosting system may require the publishers to agree to rendering the content natively through the social network's app, using social network's ad servers, abiding by the social network's policies and formats, and enabling the social network to act as the remnant monetization provider at the social network's desired revenue share. Such a scenario may prevent publishers from rendering content in their own formats, and may prevent publishers from performing recirculation and native advertising and content marketing.

Accordingly, a need exists for systems and methods for facilitating fast and configurable distribution of website content to mobile applications. More specifically, a need exists for enabling selective distributing or syndicating of website content through mobile applications using templatized, cached versions of web-, mobile-, and app-optimized content. The present disclosure is therefore directed to systems and methods for improving the distribution of website content using CDN hosting of templatized, cached versions of web-, mobile-, and app-optimized content.

SUMMARY OF THE DISCLOSURE

According to certain embodiments, computer-implemented methods are disclosed for online distribution of electronic content. One method includes receiving, from a user's mobile device, a request for a web page hosted by a publisher's content management system ("CMS"), the request including the URL of the requested web site; applying a rules engine to analyze the received URL according to a set of rules, the set of rules identifying one or more website types and/or one or more referrers; if the received URL satisfies the rules engine, redirecting the received request to a syndication server system hosted within a global content distribution network ("CDN"), the CDN maintaining fast templatized web-, mobile-, and/or app-formatted versions of the web page; adding a URL of the web page to a missing content queue and redirecting the request to a web server of the publisher's CMS if the CDN syndication server does not contain a suitable web-, mobile-, and/or app-formatted version of the web page; and delivering a package of binary compressed content of the web page to a stub page cached at the user's mobile device by the CDN syndication server, using recirculation and monetization components chosen by the publisher.

According to certain embodiments, systems are disclosed for online distribution of electronic content. One system includes a data storage device storing instructions for executing an online distribution of electronic content; and a processor configured to execute the instructions to perform a method including: receiving, from a user's mobile device, a request for a web page hosted by a publisher's content management system ("CMS"), the request including the URL of the requested web site; applying a rules engine to analyze the received URL according to a set of rules, the set of rules identifying one or more website types and/or one or more referrers; if the received URL satisfies the rules engine, redirecting the received request to a syndication server system hosted within a global content distribution network ("CDN"), the CDN maintaining fast templatized web-, mobile-, and/or app-formatted versions of the web page; adding a URL of the web page to a missing content queue and redirecting the request to a web server of the publisher's CMS if the CDN syndication server does not contain a suitable web-, mobile-, and/or app-formatted version of the web page; and delivering a package of binary compressed content of the web page to a stub page cached at the user's mobile device by the CDN syndication server, using recirculation and monetization components chosen by the publisher.

According to certain embodiments, a computer-readable medium is disclosed storing instructions that, when executed by a processor, cause the processor to execute an online distribution of electronic content, including: receiving, from a user's mobile device, a request for a web page hosted by a publisher's content management system ("CMS"), the request including the URL of the requested web site; applying a rules engine to analyze the received URL according to a set of rules, the set of rules identifying one or more website types and/or one or more referrers; if the received URL satisfies the rules engine, redirecting the received request to a syndication server system hosted within a global content distribution network ("CDN"), the CDN maintaining fast templatized web-, mobile-, and/or app-formatted versions of the web page; adding a URL of the web page to a missing content queue and redirecting the request to a web server of the publisher's CMS if the CDN syndication server does not contain a suitable web-, mobile-, and/or app-formatted version of the web page; and delivering a package of binary compressed content of the web page to a stub page cached at the user's mobile device by the CDN syndication server, using recirculation and monetization components chosen by the publisher.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

Figure 1A:
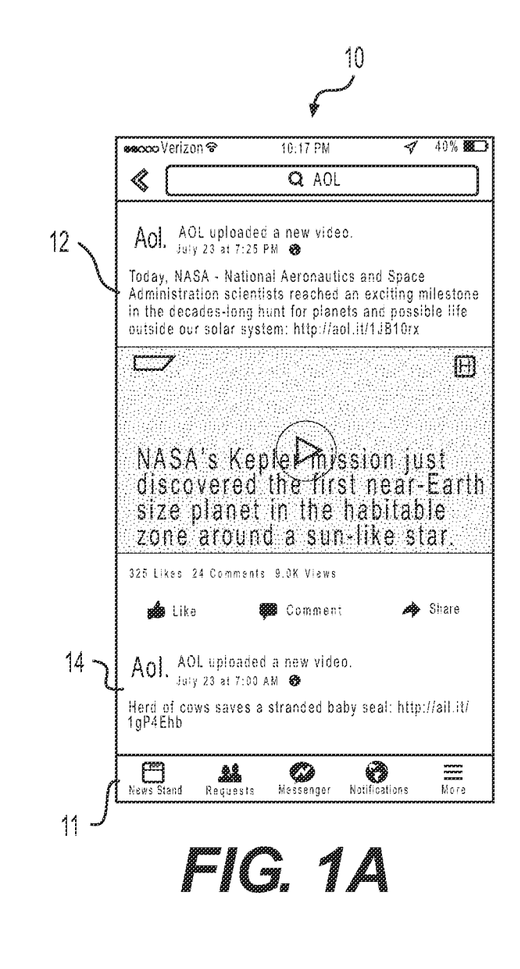
FIGS. 1A-1C are schematic screenshots of a mobile interface of a mobile application showing a content feed (FIG. 1A), a "Loading . . . " screen (FIG. 1B), and a loaded web page within a webview of the mobile application (FIG. 1C), according to an exemplary embodiment of the present disclosure.

FIG. 1A depicts a screenshot 10 of a mobile interface for viewing content within a mobile application. The mobile application may be any type of application that displays links to web pages. For example, the mobile application may be a social networking application that displays a social network feed comprising a plurality of posts that a user can scroll through and selectively click on to display websites pointed to by the links. As shown in the exemplary screenshot 10, the mobile application may be that of a social network and may include social network navigation elements 11, e.g., for selectively viewing a "news stand," "requests," "messenger," "notifications," etc. Moreover, as shown in FIG. 1A, the mobile application may display a plurality of links or "stories," such as links/stories 12 and 14. The links and/or stories may be previews or thumbnails of web pages, photos, text, hyperlinks, or any content that a user may selectively touch, tap, swipe, click, or otherwise select to view HTML content reachable through the displayed link.

Figure 1B:
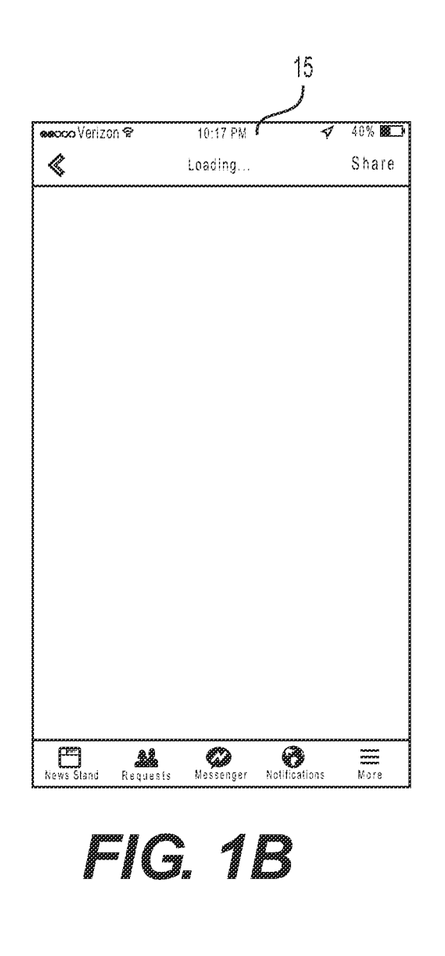

As described above, in the current state of the art, many mobile applications implement "webviews" to display web pages linked to within the applications. For example, the well-known ANDROID mobile operating system implements a Chrome-powered webview for displaying web pages within applications executing on the ANDROID operating system. Likewise, the APPLE IOS mobile operating system implements the WKWebView- and UIWebView-type webviews for displaying web pages within applications executing on the IOS operating system. Because these webviews initiate HTML calls to web servers hosting the linked HTML content, they generally take as long as 10 seconds or more to load an entire web page linked to within the application. As shown in FIG. 1B, a user often sees a blank screen and a "Loading . . . " notification 15 while the webview of the application is retrieving and assembling the various components (e.g., text, images, ads, etc.) of a given linked web page. This time-consuming process can cause users to abort or divert from viewing the desired content, which results in lost page views, lost "impressions," and therefore lost revenue, not to mention user dissatisfaction.

Figure 1C:
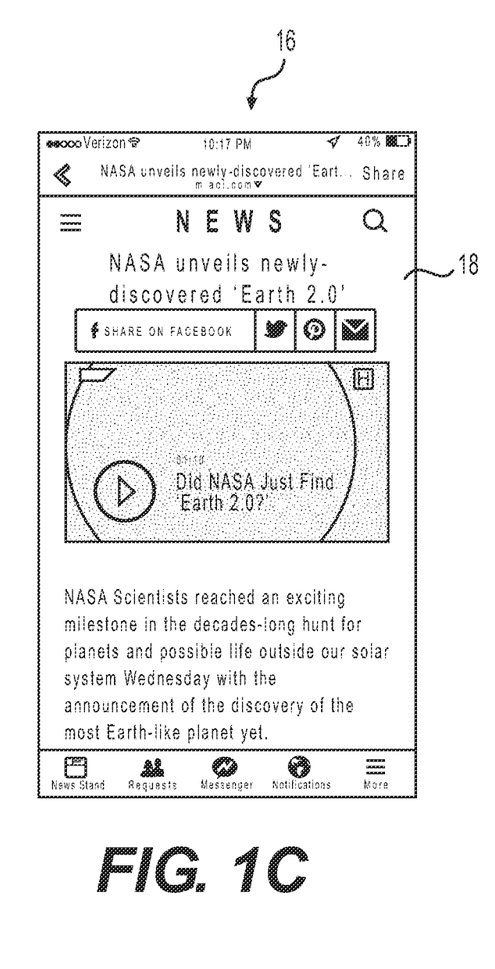

Assuming a user has waited for a mobile application's web viewer to load an entire page, then the user may be able to view the web page from within the mobile application, as shown in FIG. 1C. Specifically, while the user may still view and manipulate the social network navigation elements 11, the user may also be able to view and interact with the loaded web page 18, from within the mobile application. The user may tap or otherwise select a "back" button or "x" button to return to a news feed or other display of the social network. As described above, this overall process may have numerous drawbacks, especially involved in the time associated with retrieving from a remote web server and assembling within the webviewer the numerous components of any given web page.

Accordingly, the present disclosure is directed to systems and methods for reducing the amount of time required for loading and displaying a web page within a mobile application, e.g., as shown in FIG. 1C (and as a corollary, reducing the time that a partial web page or loading screen, e.g., screen 15 of FIG. 1B, is shown). Specifically, the present disclosure is directed to systems and methods for syndicating electronic content using a content distribution network configured with fast and flexible webview and mobile versions of content to be displayed within a mobile application. The present disclosure provides an alternative to the two suboptimal choices of hosting publishers' content on their own servers and hosting publishers' content on social networking entities' servers. Specifically, the present disclosure eliminates the unique selling proposition offered by the social networks because it enables publishers to load content extremely quickly within the mobile environment, e.g., within social networking and other mobile applications.

Assuming that each publisher has a content management system ("CMS") that drives content delivered to each of (i) web, (ii) mobile, and (iii) in-app, the present disclosure is directed to systems and methods of setting up and running a new server system (referred to herein as a "syndication server," "syndication server systems," or "syndication CDN") that receives content requests from users who are viewing and consuming content linked through social networking applications. In one embodiment, the systems and methods may involve selectively receiving content requests based on (i) web vs. mobile, and (ii) referrer. Thus, the publisher/CMS could decide, e.g., all mobile traffic from a given social networking mobile application may be redirected from the publisher/CMS to the syndication server. The publisher/CMS can further set numerous various criteria for diverting traffic from its own CMS systems to a syndication server system consistent with the present disclosure. For example, the publisher/CMS might divert traffic based on URL, domain, mobile device type, mobile application used (referrer), user ID, cookie data, time-of-day, day-of-week, and so on.

As will be described in more detail below, the presently disclosed systems and methods may involve at least two alternative embodiments. In one embodiment, the publisher may implement the system and methods for deciding which links are hosted by the syndication server. In a second embodiment, the publisher directs all traffic to the syndication server and the syndication server implements the systems and methods for deciding which links to serve up. In the first, publisher-implemented embodiment, the publisher may still host its own link and establish its own rules engine that decides which links go to the syndication server. In this case, requests would resolve through the rules engine of the CMS rules engine and then redirect to the syndication server. In the second, CDN-implemented embodiment, a link generator could be established for redirecting desired articles directly to the syndication server. The syndication server may implement a rules engine configured to determine whether each article will be served from the publisher or the syndication server.

Figure 2:
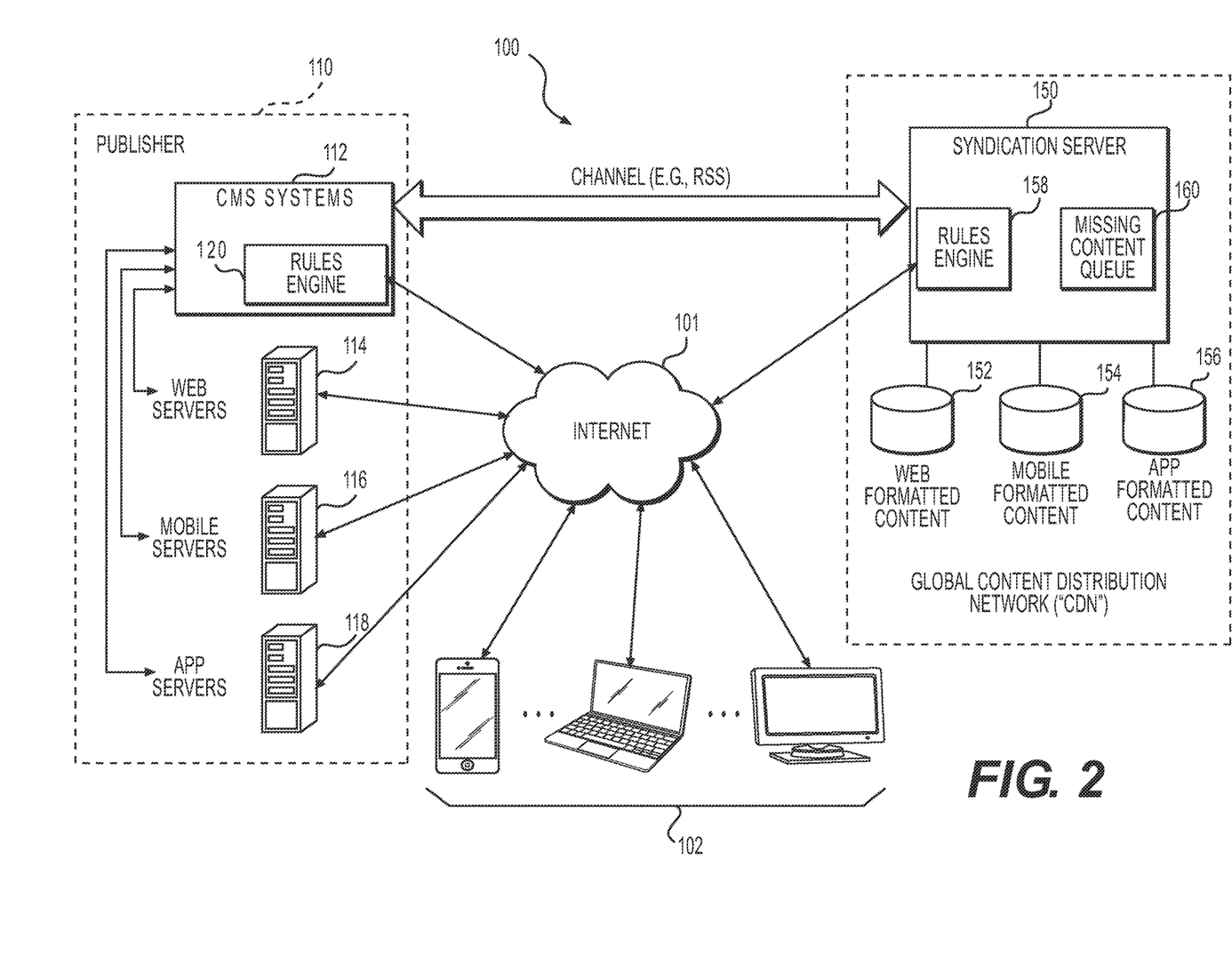
FIG. 2 is a schematic diagram of an exemplary system, servers, and entities involved in online distribution of electronic web content and advertisements, according to an exemplary embodiment of the present disclosure.

FIG. 2 depicts an exemplary network environment 100 and systems consistent with embodiments of the present disclosure. Specifically, as shown in FIG. 2, at a high level, environment 100 may include client devices 102, various publisher systems 110, and syndication server systems 150, all disposed in communication with the Internet 101. At a high level, the various publisher systems 110 and syndication server systems 150 may be disposed in communication with each other through any desired channel, which may or may not pass through the Internet 101. It should be appreciated that, while only one publisher's system is shown, in reality, the present disclosure may operate in the context of numerous (e.g., hundreds, thousands, or even millions of) publishers disposed in communication with the Internet 101 and selectively hosting their content through a syndication server system 150. Moreover, it should be appreciated that while only a selection of user devices 102 are depicted as being in communication with the Internet 101, the present disclosure of course contemplates that millions, hundreds of millions, or even billions of client user devices 102 may be configured to receive publisher content from syndication server systems over a vast, global content distribution network ("CDN") operating across the Internet 101.

In one embodiment, the syndication server systems 150 may host content of the publisher in multiple embodiments, including web views, mobile views, and/or app views, and it may do so in a manner that is extremely fast, consistent, and customizable. In one embodiment, the syndication server systems 150 may host template or "templatized" versions of the publishers' web sites in a manner that enables fast caching, fast formatting, and fast CDN delivery. The syndication server systems 150 may also provide publishers with configuration and flexibility for optional recirculation and monetization components that the publisher/CMS can optionally choose to use, thereby enabling publishers to use their own ad tags. For inbound traffic that is mobile and comes from the social network, the new server will be able to load content in less than a second, or at least less than 1.5 seconds, and still give publishers the flexibility to work with any format and recirculation they desire.

According to the presently disclosed techniques, the syndication server systems 150 enable client devices to avoid transmitting the normally large quantity of HTML requests through a mobile app webview. Instead, the presently disclosed syndication server systems will cache, in a client device's local browser, a stub page that is configured to make a single binary call for web page content to be loaded up within the mobile application's webview. Thus, the first time that any user across the network requests a web page that satisfies the given criteria (e.g., an opted-in publisher's page referred by a given social networking application), the syndication server systems 150 will cache in the device's local browser a small stub page that, from then on, will make a single binary HTTP call to the server for receiving package of binary compressed lumped content of all the text and images rendering in its document object model on the client side. Thus, the second time (say, for example, out of a million), that an article is requested, the request may be merely a cache hit on the client to the stub page, i.e., a single HTTP call out for all the content to load. Thus, the user is already reading the content, and then all the secondary back-and-forth pixels may be fired for content measurement, data collection, etc., in a delay-load asynchronous packaging container.

In one embodiment, the systems may implement a queue for handling URLs for which content is not yet cached. Specifically, the system may operate such that if a user selects a link for which the system has not yet cached content, then the syndicated server systems may redirect the user's client device to an existing web server of the publisher or publisher's CMS, and then add the URL/link to a queue in the syndication server systems to alert the syndication systems that the web page of the URL/link should be cached. Advantageously, because the system may refer user's back to the publisher's CMS, the system may avoid losing an impression in the event that the syndication system is unable to deliver the requested content.

In some cases, the embodiments of the present disclosure may be implemented in self-service portal by which publishers may templatized and upload content into the system with real-time updating of estimated or average load times of the content. Specifically, for any given page, a publisher may upload the content, view average load times, view total page views, view geographic source of page views, view numbers and stats of visits, number and percentages of bounces (i.e., diversions away from the content pre-, during-, or post-loading), and time on page. The publisher may also view the source of content in terms of the referring social application (e.g., FaceBook, Twitter, Google+, LinkedIn, etc.). Publishers may use the self-service portal to generate templates, and view the estimated page load time as it changes in real-time depending on the content, images, etc. loaded into the template. In some cases, publishers may implement APIs to incorporate templates for frequently used content, consistent with a given site's formatting, content, etc. For example, a publisher may have a different API for each site, and a plurality of page/content templates associated with each site's API.

As described above, and now shown in FIG. 2, in many cases, a publisher may implement CMS systems 112 configured to deliver content through web servers 114, mobile servers 116, and/or application "app" servers 118. Moreover, as shown in FIG. 2, the exemplary syndication server systems 150 consistent with the present disclosure may be disposed in communication with a database 152 storing web-formatted content, a database 154 storing mobile-formatted content, and a database 156 storing app-formatted content. The web-formatted, mobile-formatted, and/or app-formatted databases 152-156 may be configured to store stub pages associated with various domains, web sites, and/or even individual web pages. For example, syndication server systems 150 may crawl the Internet to obtain content for storing within web-formatted, mobile-formatted, and/or app-formatted databases 152-156. The web-formatted, mobile-formatted, and/or app-formatted databases 152-156 may store content and/or format templates of entire domains or specific web pages. The web-formatted, mobile-formatted, and/or app-formatted databases 152-156 may also store packaged binary content (e.g., compressed text and/or images) to be cached and loaded up within a mobile application executing on one or more mobile devices 102. Thus, the syndication server systems 150 may be configured to respond to requests from publishers (e.g., via CMS systems 112) and/or from many thousands of client devices 102 for various website stub pages or templates, as well as highly-efficient, fast-loading, packaged web page content.

In one embodiment, as shown in FIG. 2, the publisher CMS systems may implement a rules engine 120 for enabling the publisher to control which URLs/links are directed to and hosted by the syndication server systems 150. Moreover, as shown in FIG. 2, in one embodiment, syndication server systems 150 may implement a rules engine 158 for enabling the publisher to avoid implementing a rules engine for controlling which links/URLs are directed to and hosted by the syndication server systems 150. It should be appreciated that in one embodiment, the CMS systems 112 implement rules engine 120 whereas syndication server 150 does not implement such a rules engine; in one embodiment, syndication server 150 implements rules engine 158 whereas CMS systems 112 do not implement such a rules engine; and in yet another embodiment, both systems implement overlapping and/or complementary rules engines, with CMS systems 112 implementing rules engine 120 and syndication server systems 150 implementing rules engine 158. As also shown in FIG. 2, in one embodiment, syndication server systems 150 may implement a missing content queue 160 for storing URLs or links to articles or web pages that have not yet been cached in one or more web-formatted, mobile-formatted, and/or app-formatted databases 152-156.

As used herein, the terms "user" and "viewer" may be used interchangeably and both refer to an individual or entity accessing or attempting to access an Internet website using any device that is connected to the Internet 101, such as a computer, mobile device, television, or other device connected to, or capable of connecting to the Internet 101. The users may access the Internet 101 using a web browser or mobile application of their mobile devices 102. The mobile applications or web browsers of user devices 102 may save information about the user, such as the user's email address, other unique identity information, and/or the user's attributes, such as geographic location, website history, age, gender, search history, profession, etc. For example, the mobile applications or web browsers may save each user's information in a cookie or other suitable storage form from which the user's information may be retrieved and be accessible to a server, such as an ad server or content distribution network server 150.

In one embodiment, user devices 102 may be owned and used by one or more people, who may be viewers of web pages over the Internet, either through a mobile browser, mobile application, or web browser stored on respective user devices. As described above, user devices 102 may include any type of electronic device configured to send and receive data, such as websites and electronic advertisements, over the Internet. For example, each of user devices 102 may include a server, personal computer, tablet computer, mobile device, smartphone, and/or personal digital assistant ("PDA") disposed in communication with the Internet. Each of user devices 102 may have a web browser, mobile browser, and/or mobile application installed for receiving and displaying web and/or ad content from web servers. Thus, each of user devices 102 may be configured to receive and display data that is received from one or more of publisher servers 112-118, advertiser servers, and syndication server systems 150, among any other web servers, domain name system ("DNS") servers, content distribution network ("CDN") servers, etc., over the Internet. As described above, in one embodiment, a user may own and, simultaneously or intermittently, use one or more of user devices 102, whether of similar or different type.

Publisher web servers 110 may be owned and/or operated by any entities having inventories of available online advertising space. For example, publishers may include online content providers, search engines, e-mail programs, or any other online site or program having online user traffic. Publishers may interact with user devices 102, advertiser servers or "ad servers" (not shown), and syndication server systems 150, through publisher servers 112, 114, 116, 118 connected to the Internet. Thus, publishers may be able to communicate content and/or inventory information, such as articles, text, images, photos, videos, user data, site information, demographic information, cost information, etc., to other entities in the environment of FIG. 2.

Publisher systems 110 and/or publisher CMS system 112 may in some cases host a plurality of related websites served from a single web domain or related web domains. The publisher web pages or other content may be any web document or other web resource that may be accessed through a web browser. The publisher web pages or other content may be in any suitable format that is accessible by a web browser, such as, in HTML or XHTML format. The publisher web pages or other content may include text, graphics, video, images or any other types, or combination of types, of content viewable by a web browser. For example, the publisher web pages or other content may be primarily directed to financial news and may include current news about financial markets, with text, graphics, and images relating to financial markets. Of course, publisher web pages or other content may be related to any other type of subject matter or content. For example, a publisher may be an operator of a blog, a news site, a web portal, an e-commerce website, a social networking website, or any other publication of web content.

It should be appreciated that a publisher's website may be provided by a content provider through a Uniform Resource Locator ("URL") or an Internet Protocol ("IP") address that provides a location or an address for one or more servers on which a website resides. The website may be distributed by the one or more servers of the content provider. A content delivery network ("CDN") is a collection of servers located across the Internet. CDN providers provide infrastructure (e.g., a network of proxy servers) to content providers to achieve timely and reliable delivery of content over the Internet. The CDN's proxy servers typically cache, or store, frequently accessed content of the content provider, and then locally fulfill successive requests for the same content, eliminating repetitive transmission of identical content over network links. A user, such as individuals, businesses, or governments, uses personal computers or communication devices, such as smart phones, to access content over a CDN, which is originally provided by content providers from the one or more primary servers.

The Internet allows clients, such as web browsers on a user's machine, to use HTTP (Hyper Text Transport Protocol) to request websites from servers. The server processes the request and sends a response back to the client. HTTP is built on a client-server model in which a client accesses the content of the server.

A CDN is used to deliver content, such as websites, streaming media, and applications, to the client running on a user's computer. The CDN includes distributed content delivery nodes that are arranged for efficient delivery of content on behalf of the content providers. A request from a client for content is directed from the computer of the user to the Internet through a "point of presence," such as an Internet Service Provider (ISP), and hence to a server of the CDN (rather than being sent to the server of the content provider itself). Such routing minimizes the response time for data requests and provides high quality bandwidth. Also, such networks provide more efficient and cost-effective distribution to the computers of users.

CDNs will usually cache the content of the content provider's server locally. If a request for content that has not been cached, it generally will go directly to a primary server to retrieve the content. A proxy, sometimes referred to as a proxy server, acts as both a server and a client for the purpose of making requests on behalf of other clients. In this manner, the overhead required within a CDN to deliver cacheable content is minimized. Persons skilled in the art will also know the processes CDNs use to generate and deliver cached content.

As shown in FIG. 2, any of syndication servers 150 and corresponding databases 152-156 may be implemented across a global CDN. The syndication servers 150 may include any type of server or plurality of servers configured to process content distribution information from publishers, promotional, and/or advertising inventory information from the advertisers and/or publishers, either directly or indirectly. For example, the syndication servers 150 may process parameters relating to which websites, web pages, links, URLs, referrers, etc. to host on the CDN. The syndication servers 150 may also receive or generate processing parameters relating to publishing content formatting, monetization, recirculation, etc., from a publisher.

In certain embodiments, syndication servers 150 may be implemented as remote web servers that receive content from publishers and serve content from publishers on mobile applications of the user devices 102. The syndication servers 150 may be configured to serve content across various domains of publishers. The syndication servers 150 may also be configured to serve content based on contextual targeting of web sites, search results, and/or user/viewer information. In addition, the syndication servers 150 may be operated in coordination with one or more separate ad servers. Alternatively, in addition to performing the functions described above, the syndication servers 150 may also perform the functions of an ad server. Together, one or more ad servers and the syndication servers 150 may form an advertising and content network.

The advertising and content network may communicate with advertisers and content publishers to receive and save in memory, various parameters and instructions for displaying advertisements and publishing content on various websites. The advertising and content network may receive data regarding users, such as information regarding the user's identity, demographics, and/or search history. The components of the advertising and content network, e.g. the ad server and the syndication servers 150, may process that user data in view of the various parameters received from advertisers and content publishers, and then transmit to the content publishers what advertisements and/or content to publish so as to achieve a selective targeting of content and advertising to the user devices 102. The syndication servers 150 may function to control the syndication or distribution of content and advertising in the advertising and content network.

The syndication servers 150 may include one or more computing systems configured to receive information from entities in environment 100, process the information, and generate instructions for executing distribution of content and/or advertising, according to methods described herein. The syndication servers 150 may include any type or combination of computing systems, such as clustered computing machines and/or servers. In one embodiment, as shown in system 400 of FIG. 4, the syndication server 150 may be an assembly of hardware, including a memory 410, 420, a central processing unit ("CPU") 430, one or more communication ports 450, and/or a user interface 440. Memory 410, 420 may include any type of RAM 420 or ROM 410 embodied in a physical storage medium, such as magnetic storage including floppy disk, hard disk, or magnetic tape; semiconductor storage such as solid state disk (SSD) or flash memory; optical disc storage; or magneto-optical disc storage. CPU 430 may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. User interface 440 may include any type or combination of input/output devices, such as a display monitor, keyboard, and/or mouse.

As discussed above, the functions of the advertising and content network may be performed by a combination of an ad server and syndication servers 150 or may be performed by syndication servers 150 alone. Ad servers may include any type of servers configured to process advertising information from advertisers and/or inventory information from the syndication servers 150 and/or publishers, either directly or indirectly. In certain embodiments, ad servers may be remote web servers that receive advertising information from advertisers and serve ads to be placed by publishers. For example, ad servers may receive parameters from advertisers related to user attributes and pricing (e.g. how much the advertiser may be willing to pay for its advertisement to be viewed by a user who matches its user attribute parameters) so that the ad server may save these parameters in memory and then determine, based on information received about the potential viewer of a website and the advertiser parameters whether an advertisement should be shown to the user.

Ad servers may be configured to serve ads across various domains of content publishers, for example, based on advertising information provided by advertisers. Ad servers may also be configured to serve ads based on contextual targeting of web sites, search results, and/or user profile information. In some embodiments, ad servers may be configured to serve ads based on information and instructions received from a syndication server. The ad server and advertisers may be in direct communication with each other and may communicate via computers connected via the Internet 101.

Advertisers may include any entities having online advertisements (e.g., banner ads, display ads, rich media ads, pop-ups, etc.) which the advertisers may wish to be displayed to online users. Advertisers may interact with publisher servers 112-118, ad servers, and syndication servers 150-156 of the CDN, directly or indirectly through computers connected to the Internet 101. Thus, advertisers may be able to communicate advertising information, such as ad information, ad sizes, targeting information, consumer information, budget information, etc., to other entities in environment 100.

Figure 3:
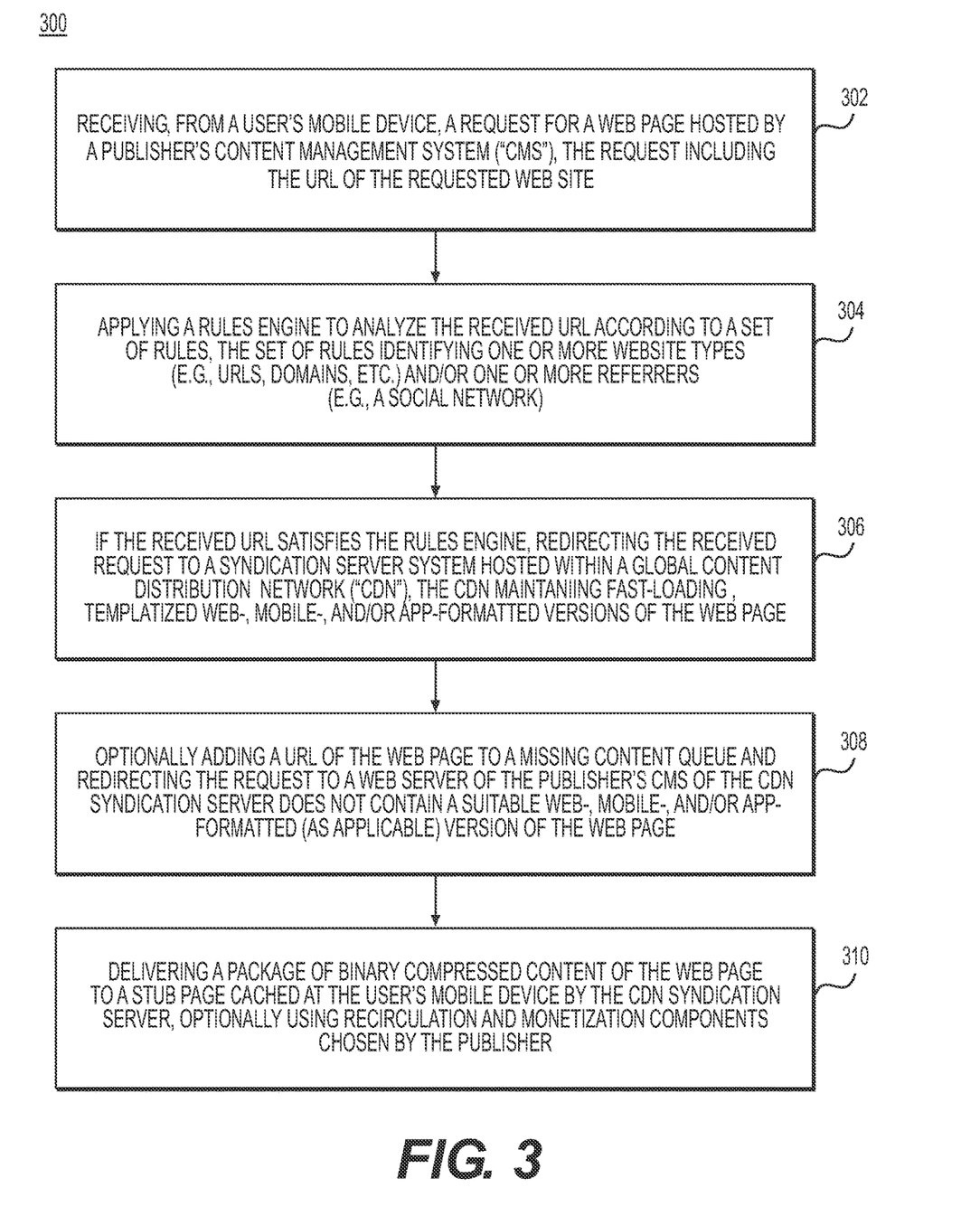
FIG. 3 is a flow diagram of an exemplary method for managing the distribution of electronic content and advertisements over the Internet, according to an exemplary embodiment of the present disclosure.

FIG. 3 depicts a flow chart of an exemplary method 300 for performing the techniques of the present disclosure. In one embodiment, method 300 may be performed entirely by syndication server systems 150. In one embodiment, method 300 may be performed by a combination of publisher 110 CMS systems 112-118 and syndication server systems 150-156, over one or both of the depicted channel or the Internet 101.

As shown in FIG. 3, in one embodiment, method 300 may include receiving, from a user's mobile device, a request for a web page hosted by a publisher's content management system ("CMS"), the request including the URL of the requested web site (step 302). For example, one or more of user devices 102 may be executing a mobile application and a user may click, tap, or otherwise select a link or URL from within the mobile application. In one embodiment, the user's selection of a web page link may be received as a request at the CMS systems 112 of the publisher 110, which in some embodiments, may be received at the rules engine 120 of the CMS systems 112 (if present).

Method 300 may further include applying a rules engine to analyze the received URL according to a set of rules, the set of rules identifying one or more website types (e.g., URLs, domains, etc.) and/or one or more referrers (e.g., a social network) (step 304). For example, in one embodiment, the applied rules engine may be rules engine 120, i.e., in the event that the publisher has maintained its own links and elected to implement its own rules engine 120 within its CMS systems 112 for selectively redirecting content requests to the syndication servers 150. In another embodiment, the applied rules engine may be rules engine 158, i.e., in the event the publisher has elected to instead use a link generator for enabling the syndication server systems 150 to perform selective redirecting and serving of content.

Method 300 may further include, if the received URL satisfies the rules engine, redirecting the received request to a syndication server system hosted within a global content distribution network ("CDN"), the CDN maintaining fast-loading, templatized web-, mobile-, and/or app-formatted versions of the web page (step 306). For example, as described above, if the web page requested by the user devices 102 satisfies certain criteria, then the syndication server systems 150 may be identified as the desired source of the requested content. For example, in one embodiment, the publisher might have established a rule that if any client device 102 requests any web page of the domain "huffingtonpost.com" from the Facebook mobile application (i.e., with referrer=Facebook.com), then the syndication server systems 150 would be identified as the desired source of the content to enable fast transmission and loading of pre-cached text and image content to the Facebook application running on the mobile device 102.

Method 300 may further include optionally adding a URL of the web page to a missing content queue and redirecting the request to a web server of the publisher's CMS if the CDN syndication server does not contain a suitable web-, mobile-, and/or app-formatted (as applicable) version of the web page (step 308). For example, as described above, if the content (e.g., binary, compressed text and images) of the requested content is not already cached within one or more of the web-formatted content database 152, mobile formatted content database 154, and/or app-formatted content database 156, then the syndication server system 150 may add the URL of the requested web page to missing content queue 160 to place the web page in a job queue for obtaining and compressing the content of the web page within the suitable database for subsequent fast loading to the next user device 102 that requests that web page.

Method 300 may further include delivering a package of binary compressed content of the web page to a stub page cached at the user's mobile device by the CDN syndication server, optionally using recirculation and monetization components chosen by the publisher (step 310). For example, assuming that the applicable database 152-156 of the syndication server systems 150 contains the content of the requested web page, then the syndication server systems 150 may retrieve the content of the requested web page from the applicable database and send the content over the Internet 101 to the mobile device 102 for loading within its mobile application. As described above, in one embodiment, the syndication server systems 150 may cause the cache, in the client device's local browser, a stub page that is configured to make a single binary call for web page content to be loaded up within the mobile application's webview. Thus, the first time that any user across the network requests a web page that satisfies the given criteria (e.g., an opted-in publisher's page referred by a given social networking application), the syndication server systems 150 will cache in the device's local browser a small stub page that, from then on, will make a single binary HTTP call to the server for receiving package of binary compressed lumped content of all the text and images rendering in its document object model on the client side. Thus, the second time (say, for example, out of a million), that an article is requested, the request may be merely a cache hit on the client to the stub page, i.e., a single HTTP call out for all the content to load. Thus, the user is already reading the content, and then all the secondary back-and-forth pixels may be fired for content measurement, data collection, etc., in a delay-load asynchronous packaging container.

Any of client devices 102, publisher 110 CMS servers 112-118, and syndication server systems 150-156 may include any type or combination of computing systems, such as handheld devices, personal computers, servers, clustered computing machines, and/or cloud computing systems. In one embodiment, client devices 102, publisher 110 CMS servers 112-118, and syndication server systems 150-156 may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor ("DSP") hardware, or any other hardware capable of executing software. The user interface may include any type or combination of input/output devices, such as a display monitor, touchpad, touchscreen, microphone, camera, keyboard, and/or mouse.

Figure 4:
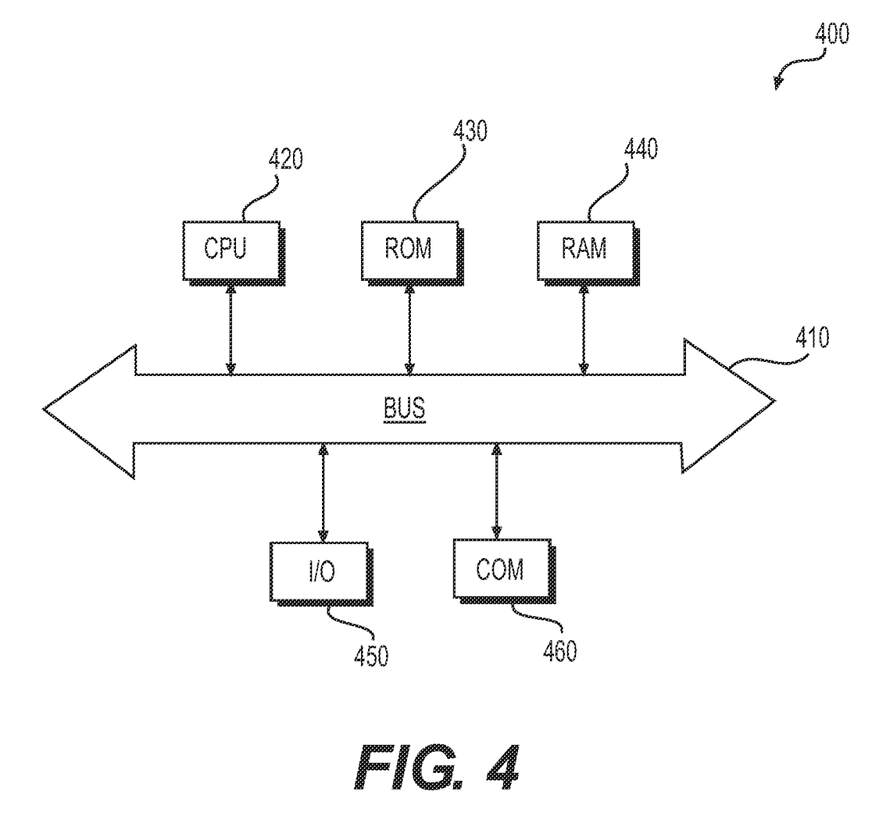
FIG. 4 is a simplified functional block diagram of a computer that may be configured as a host server, for example, to function as a CDN server and/or a content and/or advertisement server, according to an exemplary embodiment of the present disclosure.

As shown in FIG. 4, computer system 400 includes a central processing unit (CPU) 420. CPU 420 may be any type of processor device including, for example, any type of special purpose or a general-purpose microprocessor device. As will be appreciated by persons skilled in the relevant art, CPU 420 also may be a single processor in a multi-core/multiprocessor system, such system operating alone, or in a cluster of computing devices operating in a cluster or server farm. CPU 420 is connected to a data communication infrastructure 410, for example, a bus, message queue, network, or multi-core message-passing scheme.

Computer system 400 also includes a main memory 440, for example, random access memory (RAM), and may also include a secondary memory 430. Secondary memory 430, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 430 may include other similar means for allowing computer programs or other instructions to be loaded into computer system 400. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 400.

Computer system 400 may also include a communications interface ("COM") 460. Communications interface 460 allows software and data to be transferred between computer system 400 and external devices. Communications interface 460 may include a modem, a network interface (such as an Ethernet card), a communications port, a PCM-CIA slot and card, or the like. Software and data transferred via communications interface 460 may be in the form of signals, which may be electronic, electromagnetic, optical, or other signals capable of being received by communications interface 460. These signals may be provided to communications interface 460 via a communications path of computer system 400, which may be implemented using, for example, wire or cable, fiber optics, a phone line, a cellular phone link, an RF link or other communications channels.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to mobile applications and to transmitting HTTP data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol that is equivalent or successor to HTTP.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for executing an online distribution of electronic content, the method including:
    receiving, by a syndication server, a request from a user mobile device for a requested document hosted by a publisher content management system;
    in response to receiving the request from the user mobile device, transmitting, by the syndication server, content of the requested document to a stub document to be cached at the user mobile device;
    adding, by the syndication server, the requested document to a missing content queue; and
    redirecting, by the syndication server, the request from the user mobile device to a server of the publisher content management system for generation of a formatted version of the requested document and for generation of a compressed version of the requested document based on the requested document being added to the missing content queue.

2. The computer-implemented method of claim 1, further comprising:
    in response to receiving the request from the user mobile device, transmitting, by the syndication server, the requested document to a rules engine, wherein the rules engine is configured to analyze the requested document according to a set of rules.

3. The computer-implemented method of claim 2, further comprising:
    transmitting, by the syndication server, the content of the requested document to a webview within a mobile application.

4. The computer-implemented method of claim 2, wherein the rules engine is executed on the publisher content management system.

5. The computer-implemented method of claim 2, wherein the rules engine is executed on the syndication server.

6. The computer-implemented method of claim 1, wherein the content of the requested document is a package of binary compressed content of the requested document.

7. The computer-implemented method of claim 5, further comprising:
    in response to receiving the request from the user mobile device, obtaining, by the syndication server, text and images of the requested document; and
    storing the text and images in one or more of a web, mobile, or application formatted content database.

8. The computer-implemented method of claim 5, wherein the syndication server is configured to generate a stub page for at least one of a webpage or a web domain.

9. The computer-implemented method of claim 5, wherein the syndication server is configured to transmit the request to the publisher content management system using an Internet protocol or an RSS channel.

10. A system for executing online distribution of content, the system including:
    a computer readable data storage device storing instructions for executing distribution of content; and
    a processor configured to execute the instructions to perform a method including:
        receiving, by a syndication server, a request from a user mobile device for a requested document hosted by a publisher content management system;
        in response to receiving the request from the user mobile device, transmitting, by the syndication server, content of the requested document to a stub document to be cached at the user mobile device;
        adding, by the syndication server, the requested document to a missing content queue; and
        redirecting, by the syndication server, the request from the user mobile device to a server of the publisher content management system for generation of a formatted version of the requested document and for generation of a compressed version of the requested document based on the requested document being added to the missing content queue.

11. The system of claim 10, the method further comprising:
    in response to receiving the request from the user mobile device, transmitting, by the syndication server, the requested document to a rules engine, wherein the rules engine is configured to analyze the requested document according to a set of rules.

12. The system of claim 11, the method further comprising:
    transmitting, by the syndication server, the content of the requested document to a webview within a mobile application.

13. The system of claim 11, wherein the rules engine is executed on the publisher content management system.

14. The system of claim 11, wherein the rules engine is executed on the syndication server.

15. The system of claim 10, wherein the content of the requested document is a package of binary compressed content of the requested document.

16. The system of claim 14, the method further comprising:
    in response to receiving the request from the user mobile device, obtaining, by the syndication server, text and images of the requested document; and
    storing the text and images in one or more of a web, mobile, or application formatted content database.

17. The system of claim 14, wherein the syndication server is configured to generate a stub page for at least one of a webpage or a web domain.

18. The system of claim 14, wherein the syndication server is configured to transmit the request to the publisher content management system using an Internet protocol or an RSS channel.

19. A non-transitory computer-readable medium storing instructions that, when executed by a processor, causes the processor to execute online distribution of electronic content, including:

receiving, by a syndication server, a request from a user mobile device for a requested document hosted by a publisher content management system;

in response to receiving the request from the user mobile device, transmitting, by the syndication server, content of the requested document to a stub document to be cached at the user mobile device;

adding, by the syndication server, the requested document to a missing content queue; and redirecting, by the syndication server, the request from the user mobile device to a server of the publisher content management system for generation of a formatted version of the requested document and for generation of a compressed version of the requested document based on the requested document being added to the missing content queue.

20. The non-transitory computer-readable medium of claim 19, the online distribution of electronic content further comprising:

in response to receiving the request from the user mobile device, transmitting, by the syndication server, the requested document to a rules engine, wherein the rules engine is configured to analyze the requested document according to a set of rules; and transmitting, by the syndication server, the content of the requested document to a webview within a mobile application.

\* \* \* \* \*